US006985138B2

(12) United States Patent  
Charlier

(10) Patent No.: US 6,985,138 B2
(45) Date of Patent: Jan. 10, 2006

(54) INPUT WRITING DEVICE

(75) Inventor: Michael L. Charlier, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/651,576

(22) Filed: Aug. 29, 2003

(65) Prior Publication Data

US 2005/0057534 A1    Mar. 17, 2005

(51) Int. Cl.
G09G 5/00    (2006.01)
(52) U.S. Cl. .................. 345/179; 345/180; 178/19.01; 178/19.05
(58) Field of Classification Search ........ 345/173–183; 463/37–38; 178/18.01, 18.02, 18.09, 18.11, 178/19.01, 19.05
See application file for complete search history.

(56) References Cited

U.S. PATENT DOCUMENTS

| | | | | |
|---|---|---|---|---|
| 5,193,897 A | * | 3/1993 | Halsey | ........................ 362/118 |
| 5,301,222 A | | 4/1994 | Fujiwara | |
| 5,801,681 A | * | 9/1998 | Sayag | ........................ 345/157 |
| 5,864,098 A | | 1/1999 | Shinohe | |
| 6,057,540 A | * | 5/2000 | Gordon et al. | .............. 250/221 |
| 6,104,388 A | | 8/2000 | Nagai et al. | |
| 6,577,299 B1 | * | 6/2003 | Schiller et al. | ............. 345/179 |
| 2002/0175903 A1 | * | 11/2002 | Fahraeus et al. | ............ 345/179 |
| 2003/0095114 A1 | * | 5/2003 | Chuang | ....................... 345/179 |
| 2003/0107553 A1 | * | 6/2003 | Yueh | ........................... 345/163 |
| 2003/0146906 A1 | * | 8/2003 | Lin | ............................ 345/179 |

FOREIGN PATENT DOCUMENTS

| | | |
|---|---|---|
| EP | 0 962 881 A2 | 5/1999 |
| GB | 2 329300 A | 9/1997 |
| JP | 5-54168 * | 3/1993 |
| WO | WO 99/46603 | 9/1999 |
| WO | WO 99/46909 | 9/1999 |

OTHER PUBLICATIONS

The Laser Point™ Background Of The Product And Technologies; GOU Lite Ltd. Israel.

* cited by examiner

Primary Examiner—Lun-Yi Lao
(74) Attorney, Agent, or Firm—David S. Noskowicz

(57) ABSTRACT

A writing stylus (100) having a motion sensor (204) for sensing the movement of at least one end 110 of the stylus relative to an adjacent surface is described. The stylus has an elongated housing (104) and a cap (102). The motion sensor generates signals corresponding to the relative motion of the surface to the sensor. The cap is removeably carried on at least one portion of the housing which also has the motion sensor. The cap comprises a light passage (118) adapted to allow the motion sensor to sense the translation of the surface adjacent to the cap, through the cap. In a first input mode the motion sensor is used for sensing manual hand writing motion. In a second mode, when the cap is carried on the housing and is placed over at least the motion sensor, the motion sensor senses the motion of a surface adjacent to the cap such as a users finger. In this mode, the stylus functions a multiple axis input device such as a thumbwheel.

30 Claims, 5 Drawing Sheets

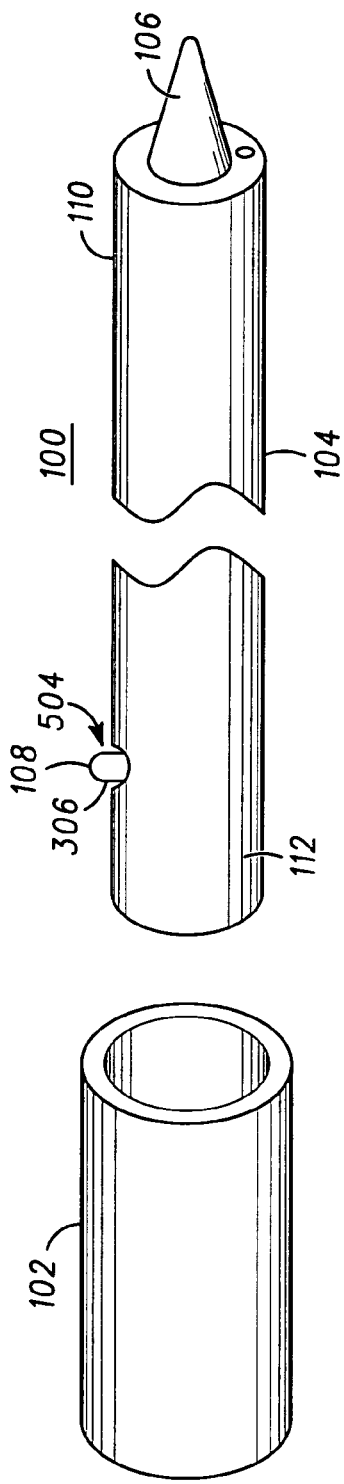
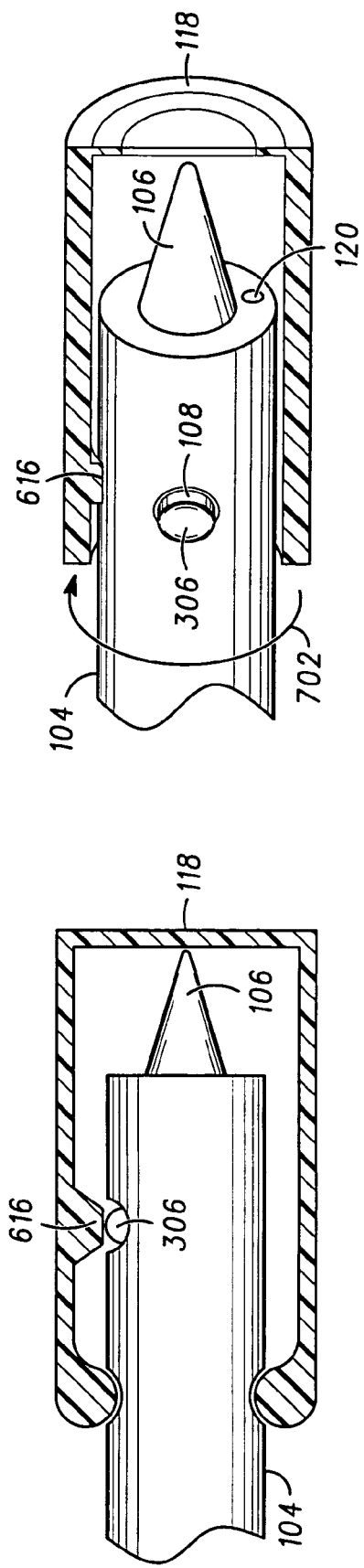
FIG. 5
FIG. 7
FIG. 6

INPUT WRITING DEVICE

FIELD OF THE INVENTION

The present invention relates generally to input devices, and more particularly to increasing the functionality of an input writing device.

BACKGROUND OF THE INVENTION

Writing implements having motion sensors to transform the relative motion or location of the implement into electrical signals are generally known. These implements, sometimes referred to as virtual pens, are commonly used as an input for artistic endeavors, such as in creating designs or otherwise controlling a graphics tablet, or for entering text in software applications. Known motion sensors for these implements include roller balls, accelerometers, optical elements, and the like. For example, one known motion sensor for a virtual pen employs splitting and recombining light beams for an accurate comparison of the surface geometries and textures against a master reference, a technique known as interferometry. These writing implements can be used with lap top computers, palm top computers, personal digital assistants (PDAs), personal communicators such as cellular telephones, or the like.

To capture handwriting motion, virtual pen devices include a motion sensor to translate motion into an electrical signal. As the user writes, with or without leaving any indicia on the writing surface, the motion of the virtual pen is detected and converted into electrical signals and subsequently transmitted and stored electronically. Handwriting recognition software can be used to convert the detection signals into text, or the text may be stored directly.

Some input devices, such as a "mouse" or a "finger wheel," incorporate a disc or sphere to facilitate scrolling of information on a display. Such discs or spheres tend to be relatively large, and are difficult to incorporate into small devices such as virtual pens. These devices also tend to experience decreasing performance, or even complete malfunction, due to build up of dirt and oils, which can be exacerbated by their mechanics.

What is needed is a motion detection system with increased flexibility and functionality.

BRIEF DESCRIPTION OF THE DRAWINGS

The various aspects, features and advantages of the present invention will become more fully apparent to those having ordinary skill in the art upon careful consideration of the following Detailed Description of the Invention with the accompanying drawings described below.

FIG. 5 shows an exemplary mode switch of the stylus;

FIG. 6 shows an exemplary mode switch of the stylus;

FIG. 7 shows an exemplary mode switch of the stylus;

DETAILED DESCRIPTION OF THE DRAWINGS

An electronic writing stylus includes a stylus and a cap. The stylus includes a motion sensor for detecting movement of the stylus relative to a surface in a writing mode. The cap includes a light passage that facilitates use of the motion sensor by a user in a finger mode. The cap may optionally be used to automatically change the mode of the stylus. As used herein, "surface mode" refers to the mode of operation wherein the principle use of the device is movement of the device relative to a surface, such as would be the case for a virtual pen writing on a surface or a mouse scrolling. As used herein, "finger mode" refers to the mode of operation where the principle use of the device is movement of a user's hand or digit relative to the device.

Figure 1:
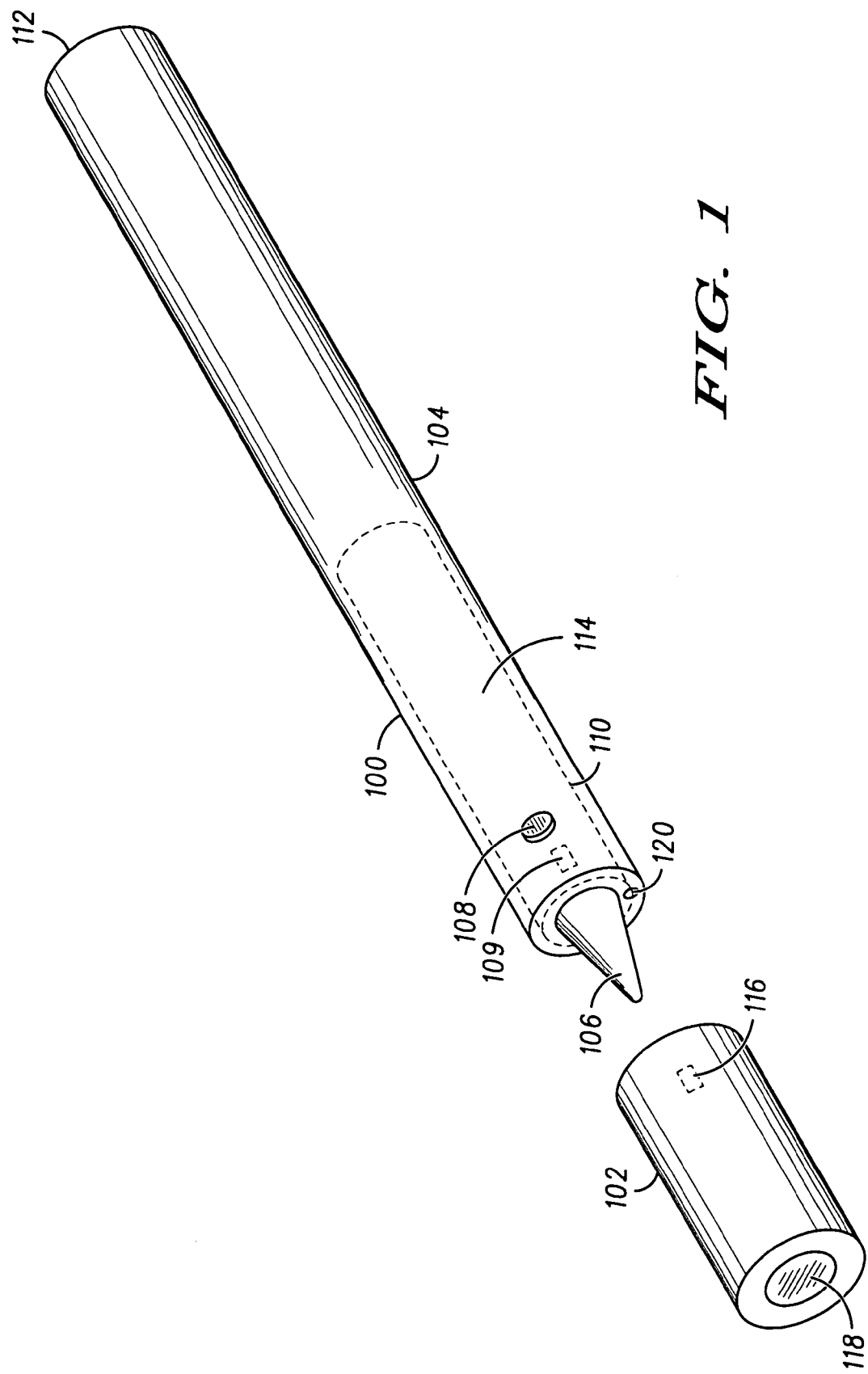
FIG. 1 shows an exemplary exploded writing device including a stylus and cap.

FIG. 1 illustrates an exemplary embodiment of a stylus 100 and cap 102. The stylus 100 includes an elongated housing 104 that is comfortable to hold in the users hand for writing. A projecting element 106 extends from an end 110 of the elongated housing 104. At least one switch 108 is carried on the elongated housing 104. In one exemplary embodiment, the switch 108 is a mode selector switch carried on the elongated housing 104 at or near the same end as the projecting element 106. An optional pressure sensitive switch 109 shown in dotted line may be disposed within the elongated housing 104. The cap includes an access portion 118, which allows light to travel to the motion sensor through the cap 102. A motion sensor 120 is carried on the elongated housing 104 at the first end in the exemplary embodiment.

Figure 2:
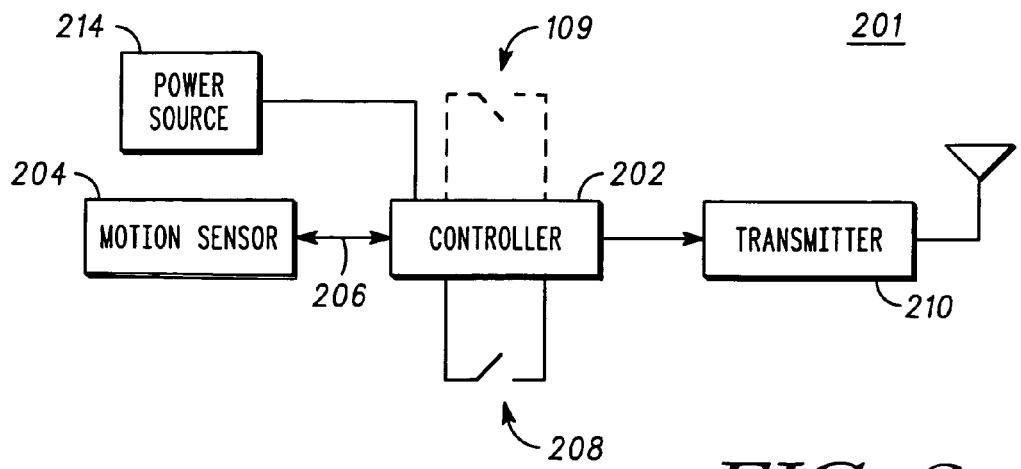
FIG. 2 shows an exemplary circuit schematic in block diagram form of the stylus.

FIG. 2 illustrates an exemplary circuit schematic of the stylus circuitry 201 in block diagram form. Disposed in the stylus 100 is generally a controller or processor 202, which is coupled to a motion sensor 204, a mode selector switch 208 and a wireless transmitter 210. The optional pressure sensitive switch 109 may also be coupled to the controller 202. Bus 206 provides communication path between the motion sensor 204 and processor 202. In place of the wireless transmitter 210, a cable (not shown) may couple the controller 202 to a terminal device receiving the information generated by the motion sensor 204. Where a cable is employed, it is envisioned that any conventional electrical connector can be employed to mechanically and/or electrically couple the cable to the stylus circuit. The location and arrangement of transmitter 210 and controller 202 are generally illustrated in FIG. 2. Wireless communication employing the transmitter and the controller within the elongated housing 104 is only an exemplary application, and is not essential to the structure of the stylus. These components may however play a role in balancing the stylus to accommodate the manual operation for handwriting input by the user. For example, some people may find that a stylus that is top heavy may be more difficult to use, whereas a balanced stylus is more ergonomic and easier to use.

The stylus 100, and more particularly the elongated housing 104, is preferably substantially the same size as a typical writing instrument. The elongated housing 104 can be gripped in the same manner as a typical ink pen or pencil. The elongated housing 104 in one exemplary embodiment is substantially cylindrical in shape having an outer surface 114, a first end 110 and a second end 112 opposite the first end 110. The elongated housing 104 comprises an inner cavity (not shown) to house the mechanical and electrical components of the stylus circuitry 201. The size of the cavity, and the resulting dimensions of the outer surface 114 of the elongated housing 104 are sized to accommodate the electronic components. In general, the internal components are the controller 202, the motion sensor 204, the transmitter 210 the switches 208, 212 and an optional power source 214. The power source 214 may be internal to the housing 104, such as by providing a battery, or power may be provided from an external source, such as through a cable.

Continuing in reference to FIG. 1 and FIG. 2, the mode switch 108 is operative to select the type of input mode in which the stylus will function. The mode switch 108 is carried on the elongated housing 104 and extends beyond the outer surface 114 of the elongated housing 108. The mode switch 108 may be implemented using any suitable conventional switch, such as a micro-switch having z-axis actuation.

Figure 3:
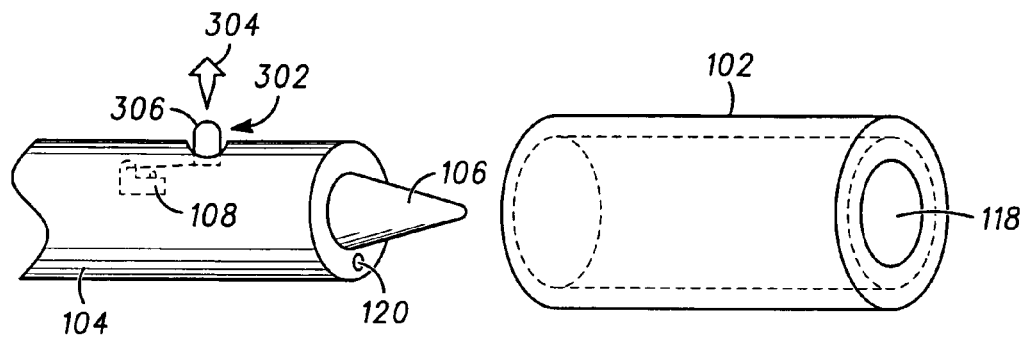
FIG. 3 shows an exemplary mode switch of the stylus.
Figure 4:
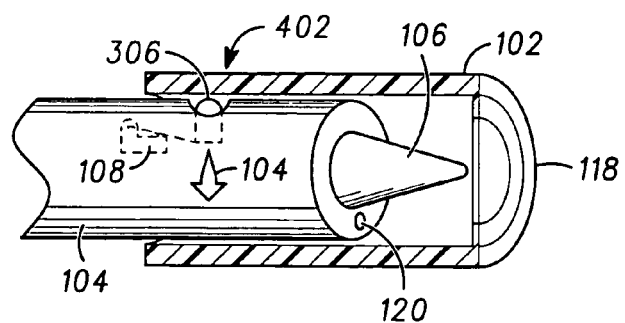
FIG. 4 shows an exemplary mode switch of the stylus.

A first type of input mode selected by the mode switch 108 is a surface mode, which may be used for hand writing input. Another type of input mode, for example, is a finger mode, which may be used in a manner similar to the operation of a joystick or the like. In one exemplary embodiment, shown in FIG. 3, a first position 302 of the mode switch 108 activates the surface mode. FIG. 4 illustrates the second position 402 of the mode switch 108 that activates the finger mode. In this embodiment, the mode switch 108 can automatically be deactivated to select the surface mode when the cap 102 is removed from the elongated housing 104. This allows the mode switch 108 to open to a released switch position, or the second position 302, indicated by arrow 304 in response to removal of the cap 102. With the cap 102 removed from the elongated housing 104, the user can use the stylus as a writing implement with or without marking media.

When the cap 102 is attached or otherwise carried over the first end 110 of housing 104, the mode switch 108 is covered as illustrated in FIG. 4. In one embodiment, it is envisioned that the dimensions of cap 102 relative to the elongated housing 104 will cause the mode switch 108 to be closed in the second position 402 by an inner wall 406 of the cap engaging a switch lever 306 as it is carried on the housing 104 over the mode switch 108. Arrow 404 indicates that the direction in which the switch lever 306 has been urged by the cap 102 in order to close the mode switch 108. More particularly, the cap 102 engages the switch lever 306 when it is slid far enough onto the elongated housing 104 to depress the switch lever 306 in the direction indicated by arrow 404 closing the mode switch 108. As the cap 102 slides over the switch lever 306, the portion of the switch lever 306 extending beyond the elongated housing 104 outer surface is depressed to close the mode switch 108. In this embodiment, the mode switch 108 and the projecting element 106 can be advantageously located at the same first end 110. Such common location results in the projecting element being covered when the cap 102 is attached. The mode switch 108 shown in FIGS. 3 and 4 is for demonstrative purposes and is not necessarily to scale. One skilled in the art will appreciate the wide range of switches available to produce the desired effect.

In another exemplary embodiment, shown in FIG. 5, the mode switch 108 is carried at the second end 112 of the elongated housing 104, opposite the projecting element 106. In this embodiment, the cap engages or closes the mode switch 108, as in the previous embodiment, when it is carried on the second end 112. The surface mode is therefore activated when the cap 102 is carried on the second end 112 when the cap engages the mode switch 108, closing the mode switch 108. Similarly the stylus 100 will be in finger mode when the mode switch 108 is deactivated when the cap is removed from the second end 112. In this embodiment, the mode switch 108 operates inversely to the previous embodiment such that the first position 504 of the mode switch 108 is an open switch position corresponding to finger mode and the second position (not shown) of the mode switch 108, is a closed position, corresponding to the writing mode. This latter embodiment allows the mode switch 108 to be carried on the end 112 of the elongated housing 104 opposite to the protruding element 106.

FIG. 6 Illustrates the cap 102 having an optional actuator 616, designed to mate or engage with the mode switch 108 when the cap 102 is in a predetermined position relative to the elongated housing 104. In this embodiment, the actuator 616 must come in contact with the mode switch 108 in order to close or activate the mode switch 108. Activating the mode switch 108 is achieved, in this embodiment, by aligning the actuator 116 of the cap 102 with the mode switch 108 in one of several ways.

One exemplary implementation, shown in FIG. 7, achieves this by placing the cap 102 on the end of the elongated housing 104, or by coupling the cap 102 to the elongated housing 104. Similar to the example above, the actuator 616, instead of the inner wall 406 of the cap 102 alone, depresses the switch lever 306 when aligned relative thereto in a predetermined position. In this embodiment, the cap 102 is aligned, prior to placement on the elongated housing 104, such that the actuator 616 will engage the switch lever 306 when the cap 102 is slid into place. As the cap 102 engages the elongated housing 104, the actuator 616 engages the switch lever 306.

In another embodiment, shown in FIG. 7 and in reference to FIG. 6, the cap 102 is placed on the elongated housing 104 and then rotated, wherein the rotation is indicated by arrow 702, relative to the elongated housing 104. The cap 102 is rotated until the actuator 616 aligns with the switch lever 306. In this embodiment, the cap 102 can be carried on the elongated housing 104 but only closing the mode switch 108 when the cap 102 is twisted or rotated into position, shown by arrow 702 wherein the actuator 616 activates the mode switch 108. To deactivate or open the mode switch 108, the cap 102 is rotated again in either direction, such that the actuator 616 disengages from the switch lever 306 of the mode switch 108. It should be recognized that the rotation of the cap 102 and actuator 616 can be in either direction to engage with or disengage from the mode switch 108.

The cap also includes the access portion 118 allowing the motion sensor to access the desired surface. The access portion 118 may be a light passage or a void in the cap. The light passage allows sufficient light to reflect off of the surface and travel to the motion sensor carried on or in the elongated housing 104. When the cap 102 is carried on the housing 104 in a predetermined configuration, the light passage 118 is aligned with the motion sensor 120. This allows the reflected light from the surface to reach the motion sensor 120 to accurately sense the relative motion of the stylus 100. The light passage 118 may be a transparent portion of the cap 102 that allows sufficient light to pass to the motion sensor 120.

Figure 9:
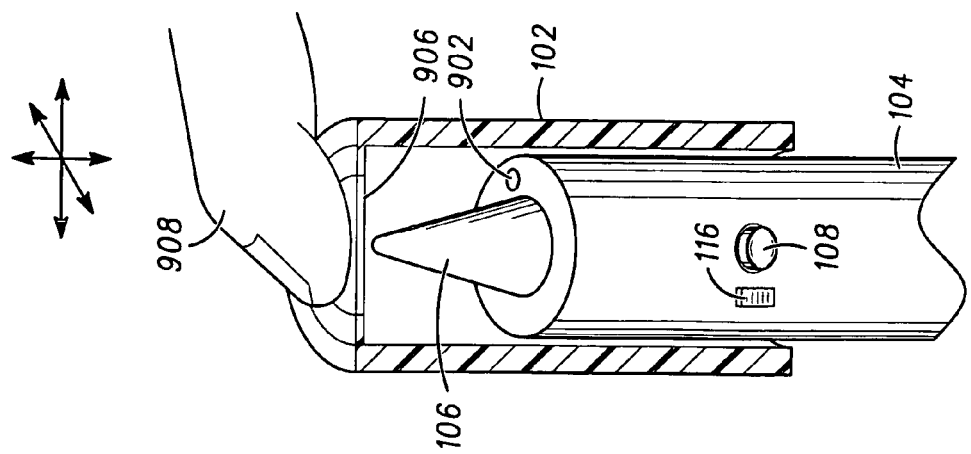
FIG. 9 shows an exemplary representation of the stylus in finger mode.
Figure 8:
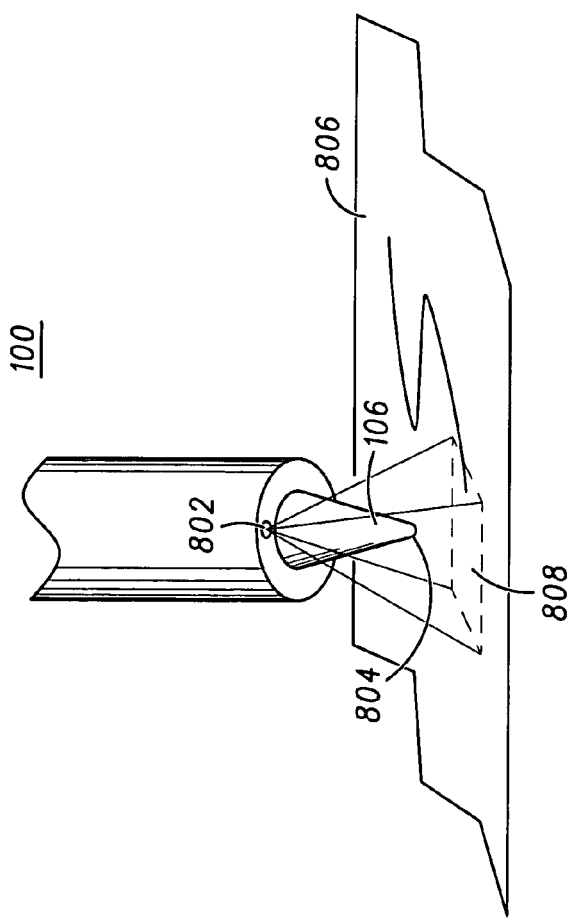
FIG. 8 shows an exemplary representation of the stylus in writing mode.

The motion sensor 120, illustrated in FIG. 1 and further illustrated in FIGS. 8 and 9, is disposed in or carried on the elongated housing 104. The motion sensor 120 detects the motion of at least one end of the stylus 100 relative to a surface and generates electrical signals corresponding to the relative stylus 100 motion. The electrical signals are interpreted by software, which is located in either the stylus 100 or the device connected thereto, and then used in conjunction with hand writing recognition software or input control software or the like. The motion sensor may be chosen from a plurality of sensor types including a laser interferometer, a roller ball, or an image capture device for example. The location of the motion sensor 120 on the stylus 100 depends on the type of motion sensor used. An interferometer is carried on the elongated housing 104 such that the motion of the desired surface can be accurately detected. In the embodiment shown in FIG. 8 the interferometer is located adjacent to the projecting element 106. The location of the roller ball may be on the projecting element 106 or a location adjacent to the access portion 118 when the cap 102 is carried on the elongated housing 104.

In one exemplary embodiment, a laser interferometer 802 is disposed in the elongated housing 104 as illustrated in FIG. 8. The interferometer 802 is disposed in the housing 104 such that the surface 806 being sensed is within a field of view 808 of the interferometer 302. The cap 102 is removed and the mode switch 108 is deactivated putting the stylus in surface mode. In surface mode, the location of the interferometer within the elongated housing 104 is such that the field of view 808 is adjacent to the point of contact of the projecting element 106 to the surface. In one embodiment the interferometer 802 is substantially adjacent to the projecting element 106 to achieve the best measurement accuracy of the motion of the surface 806 in contact with the projecting element 106. In FIG. 8, the interferometer 802 is aligned such that the field of view 808 of the interferometer 802 is adjacent to the point of contact 804 of the stylus 100. This position and size of the field of view 808 is to be optimized to provide the most accurate sense of motion of the stylus 100. This allows for the best representation during handwriting as it is to be converted into electronic representation of the handwriting. It is intended that any motion generally generated with a stylus is to be sensed and handwriting and drawing is one exemplary embodiment.

In FIG. 8, and in reference to FIG. 1, the stylus 100 is shown in writing mode. In this embodiment, the projecting element 106 is a writing element that is either a marking element, such as graphite or an ink cartridge or a non-marking element, such as a plastic tip. In one exemplary embodiment, the projecting element 106 is a marking element and the stylus 100 functions as a traditional writing implement leaving markings on the surface 806 being written or drawn on. In another exemplary embodiment the projecting element 106 is a non-marking element and the stylus 100 functions without leaving any material deposition on the surface 806. This non-marking element is generally used in electronic devices such as personal digital assistants (PDA's), hand held computers, writing tablets or the like. In these devices, the marking is created electronically and generated on a display and may also be stored in memory of one form or another. The stylus 100 inputs information in conjunction with a touch screen display or by transmitting location or motion information to the device and to the display. Either the marking or non-marking stylus 100 can be used in accordance with the motion sensor of the present invention.

The projecting element 106 extends from the first end 110 of the elongated housing 104 to contact the surface 806. In one embodiment, the projecting element 106 is exposed when the cap 102 is removed and enclosed by the cap 102 when the cap 102 is carried on the first end 110 of the elongated housing 104.

In another exemplary embodiment, the projecting element 106 is connected to a pressures sensitive switch 109. When the projecting element 106 makes contact with a surface, the pressure sensitive switch 109 is activated. This pressure activated switch 109 can be used to activate the motion sensing circuitry. When the pressure sensitive switch 109 is activated, the stylus 100 is put into either of the input modes. In the alternative, the pressure sensitive switch 109 is not present, the motion sensing circuitry is always activated, and the device receiving the input data must determine if the stylus 100 is in input mode or standby mode.

When the pressure sensitive switch 109 is employed, the cap 102 may actuate the pressure sensitive switch 109 when the cap 102 is carried on the first end 110 of the elongated housing 104. Placing the cap 102 over the projecting element 106 and activating the pressure sensitive switch 109 by 1) exerting pressure on the projecting member by the contact of the cap 102 with the projecting element 106 or 2) through an alternative actuator coupled to the pressure sensitive switch carried on the elongated housing 104. Similarly, as discussed above, the cap 102 may be rotated, once carried on the elongated housing 104, to a position relative to the pressure sensitive switch to actuate therein.

To accomplish handwriting recognition, the interferometer 802 measures the relative motion of surface placed adjacent to the interferometer 802. In one exemplary embodiment, the motion interferometer 802 includes a laser diode, detectors and optics integrated into a small transistor package. An optical grating is integrated in the sensor optics and reflects part of the illuminating light as back-diffracted beams that are focused onto the detectors. The measured surface 806 is also illuminated by a single collimated laser beam, and reflects light in all directions. Part of the light reflects back from the surface onto the detectors. The grating reflected beam serves as a local oscillator, which interferes with the reflected surface light for coherent homodyne detection by the detector.

Moving to FIG. 9, the stylus is shown gripped by a user's hand such that the stylus in oriented with the cap 102 and the protecting element 106 extending upward similar to the grip used with a joystick. The stylus is shown with the cap 102 wherein the cap 102 includes the light passage 118, or opening, enabling the operation of the motions sensor 902 when the cap 102 is carried on the first end 110. Where the exemplary embodiment utilizes a motion sensor 902 that operates based on light, the light passage 906 may be at least a transparent portion of the cap 102, or a void in the cap 102 that allows light to travel from the surface 908 being measured, to the motion sensor 902. The cap 102 also functions as a focal gage, creating a standoff between the motion sensor 902 and the surface being measure that is equal to the operational focal range of the motion sensor 902. The cap 102 is designed such that it is carried on the elongated housing 104 in the same relative position to the motion sensor 902. This can be accomplished with a tongue and grove type snap or any other similar locating apparatus known to those skilled in the art.

The stylus, illustrated in FIG. 9 is shown operating in finger mode. In this mode, the cap 102 is carried on the first end 110 of the elongated housing 104 covering the projecting element 106 and the motion sensor 902. The mode switch 108 is activated as a result of the cap 102 being carried on the elongated housing 104 and as a result the stylus is operating in finger mode. In this embodiment, the user grips the housing 104 such that at least one of the user's digits 908 is adjacent to the light passage 906 of the cap 102. The motion sensor 902 senses motion of the at least one digit 908 via the light passage 906 as the digit is moved relative to the light passage 906.

The cap 102 is adapted to removably couple to at least a portion of the pen housing 104 such that the light passage 118 of the cap 102 aligns with the field of view of the surface motion sensor 902. The light passage 118 allows the surface motion sensor 902 to properly receive reflected light and consequently the motion of the target surface 908 in accordance with the detection mechanism. Therefore, the cap is coupled to the housing such that said light passage 118 of the cap 102 allows sufficient access to the target surface and maintains a fixed distance between the target surface 908 and surface motion sensor 902. Fixing the cap 102 a predetermined distance ensures that the surface to be measured is in focus and the measurements taken accurate.

In one exemplary embodiment, the motion sensor 902 senses the motion of the user's thumb 908 relative to the light passage 118. The motion of the user's thumb 908 relative to the light passage 906 is converted into electrical signals by the motion sensor 902. These electrical signals are interpreted by the controller 202 and used to control desired functions in accordance with the software of the device in which the stylus 100 is coupled to. For example, in one embodiment, the relative motion of the user's thumb controls a pointer on a display. In this embodiment, the user grips the pen, similar to a joystick with the thumb 908 placed over the cap 102. As the user moves the thumb relative to the cap, while maintaining contact on the cap 102, a pointer displayed on a screen responds with a corresponding motion. In this mode, the stylus operates as a thumbwheel controlling input by relative motion of the thumb to the cap as the thumb slides over the cap 102. For example, as the user moves the moves the thumb 908 forward, the pointer moves up on the display. The speed of the user's thumb may also control the speed of the pointer on the display.

The motion sensor, senses motion along at least the X and Y axes relative to the stylus 100. Motion in the relative Z-axis may also be sensed depending on the type of motion sensor utilized. For example, the laser interferometer can sense motion along the all three axes. When the stylus 100 is in hand writing mode, the motion of the end of the stylus 100 along the X and Y axes is translated into electronic coordinates and utilized by the hand writing recognition software to translate the motion into electronic data. Motion along the Z-axis can be used in this mode as an input as well such as to simulate the clicking of a button to activate or change modes. For example, in one exemplary embodiment, taping of the users thumb on the cap 102 in a direction substantially along the z-axis would be sensed by the motion sensor 902 and used as an input to activate a function or mode, such as turning a function on and off.

When the stylus 100 is in finger input mode, the motion along the X and Y axes can be used to control the location of a pointer for example. The motion of the finger moving along the X and Y axes is used to control information on a display of the device connected to the stylus 100. Again, motion along the Z-axis can be translated into a button action to select a menu or activate a certain function like a momentary push button switch for example. In another embodiment, motion of the stylus 100, or at least one end thereof, is sensed by a roller ball disposed at one end of the elongated housing 104 or carried on the projection element 106. The cap 102, carried on the first end 110 of the elongated housing 104, has a void, and the projection element 106 includes the small roller ball at the tip of the projection element 106. The roller ball is located in the same plane as the void of the cap 102 allowing the users finger to contact and roll or manipulated the roller ball through the void of the cap 102, while the cap 102 is carried on the first end 110 of the elongated housing 104. A motion detector within the housing 104 or projecting element 106 senses the direction of motion of the roller ball.

Figure 10:
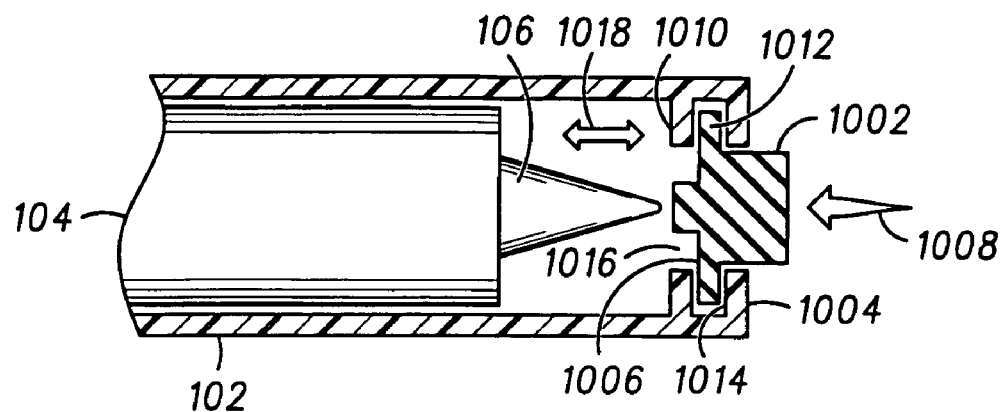
FIG. 10 shows an exemplary representation of the stylus in finger mode.

In another exemplary embodiment shown in FIG. 10, the cap 102 has a button 1002 incorporated therein. The button 1002 is located at a cap first end 1004. The cap first end 1004 is distal to the open end 1006 that is adapted to receive the elongated housing 104 in one exemplary embodiment. The cap first end 1004 retains the button 1002 such that when the cap 102 is carried on the elongated housing 104, the button 1002 is aligned with the projecting element 106 such that when the button 1002 is depressed, it contacts the projecting element 106 thereby activating the pressure sensitive switch 109 which is coupled to the projecting element 106. The button 1002 is a light passage or has at least a portion thereof that is a light passage to allow the motion sensor 120 to sense motion of the users finger through the button 1002. The entire button 1002 may be transparent allowing light to pass through the button 1002 or the light passage may be limited to the field of view of the motion sensor 120.

A resilient member 1006 couples the button 1002 to the cap 102. The resilient member 1006 allows the button 1002 to move from a first position, wherein the button 1002 is not exerting a force on the projecting element 106 to a second position, wherein the button 1002 is in contact with and exerting a force on the projecting element 106. In the first position, the button 1002 may or may not be in contact with the projecting element 106. In this first position, the button is not exerting enough force on the projecting element 106 in order to activate the pressure sensitive switch 109. The button 1002 is normally at rest in the first position. When the user exerts a downward force on the button 1002, indicated by arrow 1008, the button 1002 is urged toward and against the projecting element 106. When enough force is exerted on the button 1002, the button 1002 comes into contact or exerts a greater force on the projecting element 106. The force of the button 1002 on the projecting element 106 activates the pressure sensitive switch 106.

The cap 102 includes a flange 1010 that retains the resilient member 1006. In one embodiment, the resilient member 1006 has a complimentary resilient member flange 1012 that is adjacent to and located in-between an inside edge 1014 of the button 1002 and the flange 1010. The inside edge 1014 and the flange 1010 hold or retain the resilient member flange 1012 to the cap 102 such that the button 1002 portion is movably exposed through a void 1016 in the cap first end 1004. The button 1002 can move substantially in the direction indicated by arrow 1018.

The button 1002 and the complimentary resilient member flange 1012 can be a single component or an assembly of components. The resilient member 1006 may be made of rubber or plastic for example but may be made of any material that allows the button 1002 to move toward the projecting member 106 and spring back to the first position such that the button 1002 is not exerting any force on the projecting element 106 when it is at rest. The resilient member may also be a coil spring (not shown) or a leaf spring (not shown) coupling the button 1002 to the cap 102.

Figure 11:
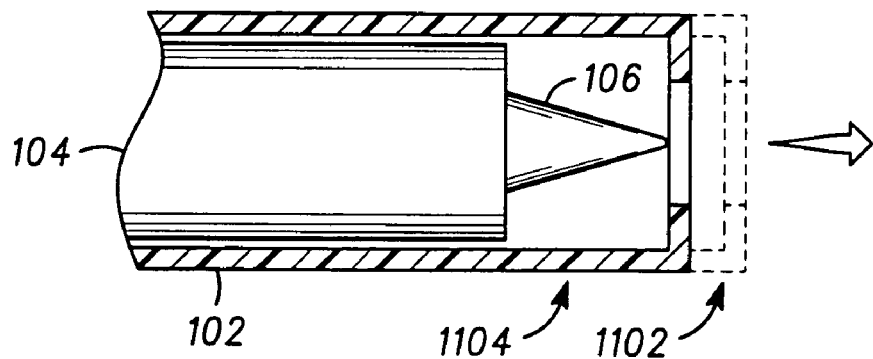
FIG. 11 shows an exemplary representation of the stylus in finger mode.

In another exemplary embodiment, shown in FIG. 11, the cap 102, carried on the elongated housing 104, moves from a first position 1102 relative to said first housing 104, to a second position 1104 on said elongated housing 104. In the second position, the cap 102 engages the projecting element 106, which engages the pressure sensitive switch 109, thereby activating the pressure sensitive switch 109. The cap 102 will automatically move or spring back to the first position when the force is removed from the cap 102. The user may press the cap 102 down with a finger or thumb, or the user may press the stylus 100 against a surface, such that the cap 102 is against the surface, thereby depressing the cap 102 from the first position to the second position activating the pressure sensitive switch 109.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. An input device comprising:
    an elongated housing;
    a cap removably carried on said housing;
    a surface motion sensor carried in said housing and adapted to sense motion of one end of said housing relative to a surface when said cap is removed; and
    wherein said cap is adapted to enclose at least a portion of said housing when said cap is carried thereon and enables manual activation of the motion sensor through the cap carried on said housing to at least partially cover said motion sensor adapted to sense motion through a transparent portion of said cap when said cap is coupled to said housing.

2. The device of claim 1, further including a projecting member extending from said one end of said housing to contact the surface, said projecting member being exposed when the cap is removed and enclosed by the cap when the cap is carried on said end of said elongated housing.

3. The device according to claim 2, wherein the projecting member is a writing element.

4. The device according to claim 3, wherein the writing element is lead.

5. The device of claim 2, wherein said projecting member is connected to a pressures sensitive switch.

6. The device of claim 5, wherein said cap actuates said pressure sensitive switch when said cap is carried on said one end of said elongated housing.

7. The device of claim 6, wherein said cap includes a button,
    wherein said button has a light passage aligned with said motion sensor and wherein said button is coupled to said cap by a resilient member, and
    wherein said button is movably engagable with said projecting element and operable to activate said pressure sensitive switch.

8. The device of claim 5, wherein said motion sensor includes an optical detector, said cap having at least a portion passing light to said optical detector.

9. The device of claim 8, said cap covering said projecting member and said surface motion sensor.

10. The device of claim 2, wherein the surface motion sensor includes a ball for contacting the writing surface when the cap is removed and said cap includes a hole providing access to said ball in the finger mode.

11. The device of claim 10, wherein said input mode switch, switches between a surface writing input mode and a finger input mode.

12. The device of claim 1, a writing implement housing capable of enclosing electronic circuitry, said writing implement housing having a stylus end, and a stylus extending from said stylus end.

13. The device of claim 1, further including a mode selector switch carried on said housing.

14. The device of claim 13, wherein the mode selector switch is responsive to said cap being carried on one of said ends of said elongated housing.

15. The device of claim 13, wherein said device is responsive to said mode selection switch to operate in a writing input mode when said cap is removed, and
    a finger input mode when said cap is carried on said elongated housing.

16. The device of claim 13, wherein the mode selector switch is response to said cap being carried on said one end of said elongated housing.

17. The device of claim 16, wherein said surface motion detector comprises:
    a laser diode;
    laser light detectors; and
    optics adapted to focus laser light.

18. The device of claim 16, further comprising:
    a input mode switch coupled to said housing;
    a cap switch portion adapted to selectively engage said input mode switch of said housing.

19. The device according to claim 13, wherein said mode selector switch is selectively engaged by said cap.

20. The device according to claim 19, wherein the cap includes an actuator to engage the mode selector switch when the cap is carried on said elongated housing.

21. The device of claim 20, wherein said motion is along a first axis or a second axis or a combination thereof.

22. The device of claim 20, wherein said surface is a users thumb.

23. An optical stylus comprising:
    a housing;
    a motion sensor disposed in said housing; and
    a cap adapted to be detachably carried on first and second ends of said housing,
    said cap including a light passage to align with said motion sensor when said cap is positioned on said first end of said housing, and
    said light passage to enable manual activation of the motion sensor through the cap.

24. The optical stylus of claim 23, further including a writing element carried in said housing.

25. The optical stylus of claim 23, wherein said cap is coupled to said housing such that said light passage is a predetermined distance from said motion sensor when said cap is carried on said first end of said housing.

26. The optical stylus of claim 23, wherein the cap includes a button, wherein said button has a light passage aligned with said motion sensor and wherein said button is coupled to said cap by a resilient member.

27. A method in a virtual pen device having an interferometer motion sensor and a pen cap, comprising the steps of:
    placing a cap having a transparent portion over a laser interferometer portion of said pen;
    selecting a finger input mode;
    sensing the motion of a surface in at least a first axis and a second axis; and
    sending motion signals in response to sensing said motion of said surface to control operations on a terminal device.

28. The method of claim 27,
sensing the motion of said surface in a third axis relative to the cap,
selecting a function in response to said sensing of said motion in said third axis relative to said cap.

29. The method of claim 27, sensing the motion of said cap relative to said virtual pen with a pressure sensitive switch, and
activating a function in response to sensing said motion of said cap.

30. The method of claim 27,
sensing the contact of a button coupled to said cap with a pressure sensitive switch, and
activating a function in response to sensing said contact.

* * * * *